United States Patent Office 2,971,927
Patented Feb. 14, 1961

2,971,927

DEHYDROGENATION CATALYST

William R. Price, Louisville, Ky., assignor to Catalysts and Chemicals Inc., Louisville, Ky., a corporation of Delaware No Drawing. Filed Nov. 17, 1958, Ser. No. 774,100

6 Claims. (Cl. 252—443)

This invention relates to the catalytic dehydrogenation of hydrocarbons. More particularly it relates to improved catalysts for dehydrogenating olefins and aralkyl hydrocarbons and to methods for preparing catalysts suitable for these reactions. My invention is particularly adapted to the dehydrogenation of low molecular weight hydrocarbons having from 2 to 10, and preferably 3 to 6, carbon atoms, but is also applicable to the hydrogenation of aralkyl hydrocarbons such as ethyl and propyl benzenes to form styrene and phenol methyl ethylenes and to convert isopropyl benzene to methyl styrene.

Processes designed to convert butene to butadiene have become of considerable importance due to the fact that butadiene is an essential intermediate in the production of synthetic rubber and various elastomers. In the production of diolefins by the catalytic dehydrogenation of mono-olefins, it is desirable to obtain as high a yield of diolefins as possible per pass of the mono-olefin through the dehydrogenation zone, and as a corollary to this purpose it is also desirable to obtain as small amount as possible of by-products. The efficiency of the catalyst is best measured in terms of percent selectivity, which means the percent of the total amount of the initial material which undergoes conversion which is converted to the product. In other words, the percent selectivity is obtained by dividing the percent conversion per pass into the percent yield per pass. Commercially the process normally operates at a conversion level of from about 20 to 25%. The selectivity or ultimate recycle yield varies with feedstock purity, operating conditions and catalyst but is usually in the range of from 70 to 80%.

The dehydrogenation of olefins to the corresponding diolefins differs from most other dehydrogenation processes in that it requires a low partial pressure of reactants in the reaction zone. Thus in all known processes of preparing diolefins by dehydrogenation it is necessary either to carry out the dehydrogenation under a substantial vacuum or to employ large quantities of a diluent. Operation under vacuum is very costly and the use of inert diluents to decrease the partial pressure of the reactants usually makes the efficient separation and recovery of the diolefins from the product difficult and is a serious disadvantage. Steam is an ideal diluent but unfortunately many of the dehydrogenation catalysts are not suited for use in the presence of steam. Of the steam insensitive catalysts, the most widely used comprises iron oxide, chromium oxide and massive amounts of an alkali metal compound. This catalyst has a practical disadvantage in that it is structurally weak and extremely hygroscopic. Thus when it is used with copious amounts of steam, it tends to disintegrate and build up pressure which impedes the flow of gases through the catalyst bed. As previously stated low pressures favor the equilibrium of the desired reaction and disintegration of the catalyst within the reactor is therefore very disadvantageous.

An object of this invention is to provide a highly promoted catalyst which possesses good physical strength and is non-hygroscopic.

Another feature of the best available dehydrogenation catalysts is the fact that the micro surface area is relatively low, i.e. from 3 to 10 m.$^2$/gm. Accordingly the geometric or macro surface area is of considerable importance, and it has been found in the production of butadiene from butylene that markedly improved results are obtained merely by decreasing the particle size of the pellets from $3/16''$ to $1/8''$ pellets. However, as is well known, a decrease in pellet size is accompanied by a decrease in physical strength. Thus in practice, this known advantage has not been exploited due to the fact that small catalyst pellets of sufficient strength were not available.

Another object of this invention is to produce non-hygroscopic catalyst pellets of small particle size having proper physical properties.

Retention of catalytic activity in the alkalized iron oxide catalysts is due to three factors, viz. the structural stability of the catalyst, the effect of promoters with respect to the oxidation state of the catalyst and the effect of promoters with respect to the removal of carbonaceous deposits. In the iron oxide catalysts previously used the activity has been found to decline in at least three ways. In the first place the active metal oxide in the catalyst gradually becomes reduced to an inactive state under the mildly reducing conditions of the process. This deactivation is temporary since the catalyst is reoxidized during the periodic regeneration treatment. It is nevertheless disadvantageous since it prohibits the use of long process periods even if the deactivation due to the effect of carbonaceous deposits were eliminated. Furthermore, after regeneration, the catalyst is usually in a higher than desired state of oxidation and as a consequence requires a certain induction period during which it is reduced to the proper state. Simultaneously with the above described deactivation mechanism, the hitherto known catalysts undergo a more gradual deactivation of a deep seated nature. This deactivation is caused by certain structural changes which take place in the catalyst. These changes are accelerated by elevated temperatures. Thus, although they may take place relatively slowly at the temperatures required for dehydrogenation processes, they take place more rapidly at the high temperatures sometimes encountered during regeneration. Since this loss of activity is permanent (i.e. the catalyst can not be brought back to the original activity by any known method), the effective life of these catalysts is relatively short. One cause of this deep seated deactivation lies in the fact that certain constituents tend to form a solid solution with the iron oxide, thereby producing undesirable changes in the crystalline structure of the major catalytic constituent. Among these constituents are magnesia and alumina. Thus in the light of this knowledge, this class of materials has been scrupulously avoided in preparation of catalysts of the type in question.

An important object of this invention is to provide a class of material which imparts structural stability to the alkalized iron oxide catalyst.

The third cause of deactivation of the prior art catalysts when used in processes of the type in question is the deposition of carbonaceous material on the catalyst. There is no known catalyst which is sufficiently selective in its action to allow the desired conversion to be carried out without at least some reaction such as cracking, polymerization, and excessive dehydrogenation. Consequently, all of the known catalysts gradually become coated with carbon and tarry deposits, and these deposits generally are sufficient to cause a serious loss of catalytic activity in a very short time.

Another object of this invention is to provide a method of preparing such catalysts whereby said catalysts are physically and chemically stable to carbonaceous deposits and are physically resistant to repeated steam regeneration. Other important objects will be apparent to those skilled in the art by reference to the following detailed description.

It has now been found, and the invention is based upon the discovery, that a physically stable non-hygroscopic dehydrogenation catalyst, characterized by good activity and selectivity may be prepared by admixing kaolin and water with iron oxide and an alkali metal compound, forming the mass into desired shapes and calcining the shaped pellets at a temperature in the range of from about 550° C. to about 800° C. A wide variety of materials have been suggested for use with the basic alkalized iron oxide composition, chief among which are the oxides of silicon, aluminum, magnesium, zinc, beryllium and copper. Each of these materials has been found to be disadvantageous in one way or another. As an example, copper has been found to increase the rate of reduction of the iron oxide under process conditions whereas materials such as aluminum and magnesium oxide tend to react at elevated temperatures to form undesirable spinels. It was surprising, therefore, to find that, among the many catalytic agents which have been proposed for this purpose, kaolin is unique in that it imparts physically stabilizing and non-hygroscopic properties to the catalyst without promoting or accelerating, through the medium of solid solution, undesired structural changes therein.

China clay, or kaolin, is a unique material found in large quantities in nature (therefore cheap) and is readily distinguishable from and has definite advantages over other materials heretofore proposed. Insofar as I am aware, the use of china clay or kaolin with alkalized iron oxide as a dehydrogenation catalyst has never been disclosed. China clay or kaolin is sometimes called alba or white bole, terra bole, argilla or porcelain clay and is a natural plastic material of remarkably high uniformity in characteristics and properties. It is composed of aluminum, silicon, oxygen and hydrogen corresponding to the general formula, $Al_2O_3 2SiO_2 2H_2O$. Kaolin is sometimes referred to as an aluminum-silicate but is probably an aluminosilicic acid. It differs from the other so-called clays and can be distinguishhed therefrom in the following respects. Infusorial earth, kieselguhr and silica gel are siliceous materials primarily composed of silicon and oxygen and are, therefore, entirely different in composition and properties. These materials lack plasticity and the property of hardening. Fuller's earth is not a true clay in that it lacks plasticity entirely and is readily fusible, unlike china clay. Montmorillinite also has very little plasticity. It is composed largely of hydrogels of silica and is decomposed by boiling acids such as hydrochloric acid. Bentonite, while highly colloidal, also lacks plasticity. Both montmorillinite and bentonite have a much higher silica to alumina ratio and water content than kaolin. They are both amorphous whereas kaolin shows a crystalline X-ray structure. The plasticity of kaolin and its hardening characteristics are attributable to the interlocking of the minute crystals as well as chemical changes which are indicated by low temperature transition points and loss of water on heating.

Having now characterized china clay or kaolin, I shall now proceed to show how it is used and how modified compositions may be made and used in connection with the present invention.

The catalysts of my invention contain iron oxide as the predominating active dehydrogenating constituent. A convenient and economical source of iron oxide is in the form of commercial pigments which are of uniform purity and particle size. However, iron oxides may also be prepared by the thermal decomposition of iron compounds such as ferric nitrate, ferric oxalate or by precipitation from solutions of iron salts such as ferric nitrate, ferrous sulfate, etc. followed by thermal decomposition. Generally, however, the latter procedures do not produce an oxide of uniform characteristics and high purity at a cost competitive with that of commercial pigments. The concentration of the iron oxide in the finished catalyst may vary over a considerable range. Nevertheless the catalyst should contain on a finished basis at least 35% by weight or iron oxide but not more than about 80% by weight. Preferably the concentration of iron oxide is in the range of from 45 to 60% by weight. It is essential that the iron oxide be alkalized by the incorporation of a suitable compound of potassium. Most of the compounds of potassium are suitable, as for example, the nitrate sulfate or carbonate of potassium. Under reaction conditions these materials are converted at least in part to the oxide. Compounds of the alkaline earths, i.e. calcium strontium and barium may be utilized in conjunction with the compounds of potassium and in addition to enhancing the stabilizing action of the potassium compounds also tend to impart physical strength and hardness to the kaolin. The concentration of alkali may vary over a wide range from about 5% to about 40% by weight. Alkaline earth oxides, if utilized, should not exceed 10% by weight of the catalyst and preferably should be in the range of 1–5% by weight since the addition of these constituents is at the expense of the more effective compounds of potassium or of the active dehydrogenating metal oxides. The amount of chromium oxide is not especially critical and as little as 1% by weight is quite effective. The kaolin concentration should be in the range of between about 10 to about 30% by weight. The various constituents are admixed with water and formed into suitable shapes by extrusion. The extrudates are then subjected to a heat treatment at a temperature above about 550° C. (but below that which causes excessive sintering). The period and temperature of heat treatment is dependent to some extent on the nature of the raw materials. Thus, if the iron oxide utilized, has a high surface area in the range of from about 40 to about 100 m.$^2$/gm., it is necessary to calcine the material at a temperature sufficiently high and for a period sufficiently long to reduce the surface area to a range of about 3 to 10 m.$^2$/gm. On the other hand, if the surface area of the iron oxide is within or approaching the proper range, calcination is still essential since it causes a certain interaction between the catalytic constituents and the stabilizing agents, whereby the stabilizing agents become intimately bound in the catalyst. The temperature and the period of time of calcination, however, may be decreased. Generally a temperature in excess of 550° C. is required in any case and a preferred temperature is in the range of about 600° C. to about 800° C.

As pointed out heretofore, it is desired to provide catalysts which tend to regenerate themselves and are capable of effecting practical dehydrogenation under process conditions. In order to accomplish this it is necessary that a particular state of oxidation of the iron oxide constituent and a particular path of the oxidation-reduction reaction be established. Taking the alkalized iron oxide catalyst as an example, the iron oxide tends to undergo the following reactions:

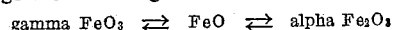
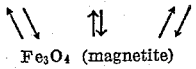

The desired form is believed to be that having the spinel type crystal lattice (i.e. gamma $Fe_2O_3$ and $Fe_3O_4$) and the desired state of oxidation is believed to correspond approximately to $Fe_3O_4$. These oxides are particularly prone to form pseudo morphs, that is to say, when the crystalline oxides are oxidized or reduced, the crystalline form of the starting material is often retained in the product even though such a crystalline form of the product is thermodynamically unstable. Thus, for example, ferrous oxide can be oxidized directly either to the stable alpha or the labile gamma $Fe_2O_3$. The desired gamma $Fe_2O_3$, which has a spinel type crystalline lattice and can not be distinguished from $Fe_3O_4$ by X-ray analysis, can be formed as an intermediate product. Therefore, the gamma $Fe_2O_3$ can be looked upon as a pseudo morph of $Fe_3O_4$. In order to control the path of the oxidation-reduction reaction, stabilizing promoters must be incorporated into the catalyst. Suitable stabilizing promoters are the oxides of the strongly electro-positive alkali metals of high molecular weight and ion size (i.e. K, Rb, Cs and the oxides of the alkaline earth metals, Ca, Sr and Ba). Although these oxides function in the desired capacity, they are not equivalent in their action in the catalyst. The members of the first group are considerably more effective than the others and of those, cesium is the most effective, rubidium is the next effective, and potassium is the least effective. However, potassium is very efficient and because of the prohibitive cost of cesium and rubidium, potassium is universally used. The members of the second group are not as effective as members of the first group but have an advantage of also imparting hardness and physical strength to the finished catalyst. Accordingly, a concentration of this class of materials is maintained at about 10% of the amount of kaolin used, i.e. a ratio of about 1:10 alkaline earth oxide to kaolin. Of the second group calcium oxide is the most effective and preferred agent.

These agents are also effective for the continuous removal of carbonaceous deposits from the catalyst surface during the reaction. This occurs by the well known reaction $C+2H_2O=CO_2+2H_2$. It will be noted that the stabilizing agents and stabilizing promoters function in both capacities. It should be noted, however, that in these cases, there is nevertheless a clear and distinct line of demarcation between the functions. Thus, although there may be only one stabilizing oxide in the catalyst, there may be in fact two distinct proportions of this material each acting in a separate capacity and, therefore, in fact two stabilizers present. As pointed out, a stabilizing oxide is more or less bound in the catalyst.

The third constituent of the catalyst is chromium oxide which together with iron oxide constitutes a unique combination since these two oxides form solid solutions in all proportions. Also chromium oxide itself exerts a catalytic action which is comparable to that of iron oxide per se. Because of these facts the concentration of chromium oxide is not extremely critical. Even small amounts of chromium oxide are quite effective. Even though the iron oxide ($Fe_2O_3$) and chromium oxide ($Cr_2O_3$) may form a solid solution, they cannot react under oxidizing conditions to form a chromite. Since the process is carried out with large concentrations of steam, the reaction to form the chromite is largely prevented. To avoid this danger, a molecular excess of iron oxide with respect to chromium oxide is utilized. It is believed that the proper crystal type of iron oxide quickly comes to equilibrium through the medium of solid solution with the chromium oxide and the action of the stabilizing promoters previously indicated. Thus the form of the initial iron oxide is relatively unimportant and can be either gamma $Fe_2O_3$ or alpha $Fe_2O_3$. As previously stated, a convenient source of high quality iron oxide is available as iron oxide pigments which in the case of the red pigment is in the alpha form. The preferred form of the catalyst may be conveniently prepared as follows:

*Example*

A catalyst containing on the final basis 51.2% $Fe_2O_3$, 26.3% $K_2CO_3$, 2.5% $Cr_2O_3$ and 20% kaolin was prepared by admixing the required proportions of these materials in the dry state. About 25% water was added and the plastic admixture thus formed was extruded through a ⅜" die and the extrudates were dried and calcined for eight hours at 1470° F. (800° C.). The pellets possessed an average side crush strength of 25 pounds, and broke with a conchoidal fracture. The resulting discrete pieces could be subjected to about 10 pounds more pressure before disintegrating. The catalysts were non-hygroscopic to the extent that they could be soaked in water for several days without losing their physical appearance and strength.

These catalysts are active for the dehydrogenation of monoolefins and aralkyl aromatics and possess superior activity and selectivity for these reactions. Furthermore the advantage of increased strength and physical stability of the catalysts of this invention enables the practical utilization of methods which increase the macro surface of the catalyst, as for example, production of small diameter extrudates and use of pore induction techniques, which in turn results in overall process efficiency.

It is obvious that many variations and modifications will occur to those skilled in the art, which do not depart from the spirit and scope of this invention; therefore, only those limitations should be imposed as are encompassed by the appended claims.

I claim:

1. A non-hygroscopic catalyst resistant to the disintegrating action of steam under pressure suitable for the dehydrogenation of olefins and aralkyl hydrocarbons in the presence of steam, which consists of iron oxide in a concentration by weight of from about 45 to about 60%, a compound of potassium selected from the group consisting of potassium nitrate, potassium sulfate, and potassium carbonate in a concentration by weight of from about 5 to about 40%, chromium oxide in a concentration by weight of from about 1 to about 5%, kaolin in a concentration by weight of from about 10 to about 30%, and an alkaline earth metal oxide present in a weight ratio in relation to the kaolin of about 1–3:10, said catalyst being further characterized by a micro surface area in the range of from about 3 to about 10 m.²/gram.

2. The catalyst of claim 1 in which the compound of potassium is potassium carbonate and is present in a weight ratio of potassium carbonate to iron oxide of about 1:2.

3. The catalyst of claim 1 in the form of ⅛ inch diameter extrudates in which the compound of potassium is present in a weight concentration of about 20% and the kaolin is present in a weight concentration of about 15 to 20%.

4. The method of producing a non-hygroscopic catalyst resistant to the disengrating action of steam over pressure suitable for the dehydrogenation of olefin and aralkyl hydrocarbons in the presence of steam at elevated temperatures which comprises the steps of forming an admixture consisting essentially of from 45 to 60% by weight of iron oxide, from 5 to 45% by weight of a compound of potassium, selected from the group consisting of potassium nitrate, potassium sulfate, and potassium carbonate, 1 to 10 parts by weight of chromium oxide, 10 to 30 parts by weight of kaolin and water, extruding said admixture and calcining the extrudates at a temperature in excess of about 550° C. but not in excess of about 850° C.

5. The method of claim 4 in which the iron oxide has a surface area in the range of about 5 to about 15 m.²/gm. and the calcination temperature is in the range of from 700 to 800° C.

6. The method of claim 4 in which the admixture consists essentially of the following constituents on a dry basis:

| | Percent by weight |
|---|---|
| Iron oxide | 45 to 60 |
| Potassium compound selected from the group consisting of potassium nitrate, potassium sulfonate and potassium carbonate | 5 to 40 |
| Chromium oxide | 1 to 5 |
| Kaolin | 10 to 30 | and in which the calcination temperature is in the range of from 600 to 800° C.

References Cited in the file of this patent

UNITED STATES PATENTS

| 1,937,588 | Pier | Dec. 5, 1933 |
| 2,369,001 | Ahlberg | Feb. 6, 1945 |
| 2,444,965 | Thomas | July 13, 1948 |
| 2,509,869 | Kirshenbaum | May 30, 1950 |
| 2,866,790 | Pitzer | Dec. 30, 1958 |